US011689609B2

(12) United States Patent
Vidyananda et al.

(10) Patent No.: US 11,689,609 B2
(45) Date of Patent: *Jun. 27, 2023

(54) MECHANISM FOR WEBPAGE COMPOSITION

(71) Applicant: Open Text Corporation, Waterloo (CA)

(72) Inventors: Naveen K. Vidyananda, Bangalore (IN); Sachin Gopaldas Totale, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,751

(22) Filed: Jun. 30, 2022

(65) Prior Publication Data
US 2022/0337658 A1 Oct. 20, 2022

Related U.S. Application Data

(63) Continuation of application No. 16/857,944, filed on Apr. 24, 2020, now Pat. No. 11,412,031, which is a continuation of application No. 16/378,252, filed on Apr. 8, 2019, now Pat. No. 10,637,913, which is a
(Continued)

(51) Int. Cl.
*H04L 67/10* (2022.01)
*H04L 67/02* (2022.01)
*G06F 9/451* (2018.01)
*G06F 16/958* (2019.01)
*G06F 9/445* (2018.01)

(52) U.S. Cl.
CPC .............. *H04L 67/10* (2013.01); *G06F 9/451* (2018.02); *G06F 16/958* (2019.01); *H04L 67/02* (2013.01); *G06F 9/44505* (2013.01)

(58) Field of Classification Search
CPC .... G06F 9/44505; G06F 9/451; G06F 16/958; H04L 67/02
See application file for complete search history.

(56) References Cited

U.S. PATENT DOCUMENTS

| 2002/0065851 A1* | 5/2002 | Watson | G06F 16/972 |
| | | | 715/205 |
| 2003/0014442 A1* | 1/2003 | Shiigi | G06F 8/20 |
| | | | 715/255 |

(Continued)

*Primary Examiner* — Thomas J Dailey
(74) *Attorney, Agent, or Firm* — Sprinkle IP Law Group

(57) ABSTRACT

During web application development, receiving a request for a webpage for a first business object type, the first request comprising a first business object type identifier of the first business object type, receiving a first expression for selecting an instance of the first business object type from a plurality of instances of the first business object type from an object data source, the expression specifying a first data source and an operation and generating the webpage, the webpage comprising a first user interface (UI) widget for the first business object type and a first instruction for prepopulating the first UI widget with first data from the instance of the first business object type, the first instruction including the first expression, the first expression executable to perform the operation on data from the first data source to generate a result identifying the instance of the first business object type.

20 Claims, 7 Drawing Sheets

Related U.S. Application Data continuation of application No. 14/670,949, filed on Mar. 27, 2015, now Pat. No. 10,277,665.

(56) References Cited

U.S. PATENT DOCUMENTS

| | | | |
|---|---|---|---|
| 2006/0005114 A1* | 1/2006 | Williamson | G06T 11/20 345/419 |
| 2007/0162846 A1* | 7/2007 | Cave | G06F 16/958 715/764 |
| 2008/0201118 A1* | 8/2008 | Luo | G06F 16/958 703/2 |
| 2011/0023017 A1* | 1/2011 | Calvin | G06F 16/958 717/120 |
| 2012/0137227 A1* | 5/2012 | Gerken, III | G06F 8/38 715/747 |
| 2012/0290433 A1* | 11/2012 | England | G06Q 30/0631 705/26.7 |
| 2013/0117152 A1* | 5/2013 | Mebed | G06Q 30/00 705/27.2 |
| 2014/0157106 A1* | 6/2014 | Bertram | G06F 40/143 715/234 |

* cited by examiner

MECHANISM FOR WEBPAGE COMPOSITION

RELATED APPLICATIONS

This application is a continuation of and claims the benefit of priority under 35 U.S.C. § 120 to U.S. patent application Ser. No. 16/857,944 filed Apr. 24, 2020, issued as U.S. Pat. No. 11,412,031, entitled "Mechanism for Webpage Composition," which is a continuation of and claims the benefit of priority under 35 U.S.C. § 120 to U.S. patent application Ser. No. 16/378,252 filed Apr. 8, 2019, issued as U.S. Pat. No. 10,637,913, entitled "Mechanism for Webpage Composition," which is a continuation of and claims the benefit of priority to U.S. patent application Ser. No. 14/670,949 filed Mar. 27, 2015, issued as U.S. Pat. No. 10,277,665, entitled "Mechanism for Webpage Composition," which are hereby fully incorporated by reference herein.

BACKGROUND

A web application is a software application that executes in a web browser. The web application may include one or more features, such as graphical user interface widgets, processes, and other aspects of the web application. In developing a web application, a developer may desire to have a webpage prepopulated with data, that may then be updated by an end user.

DETAILED DESCRIPTION

Figure 1:
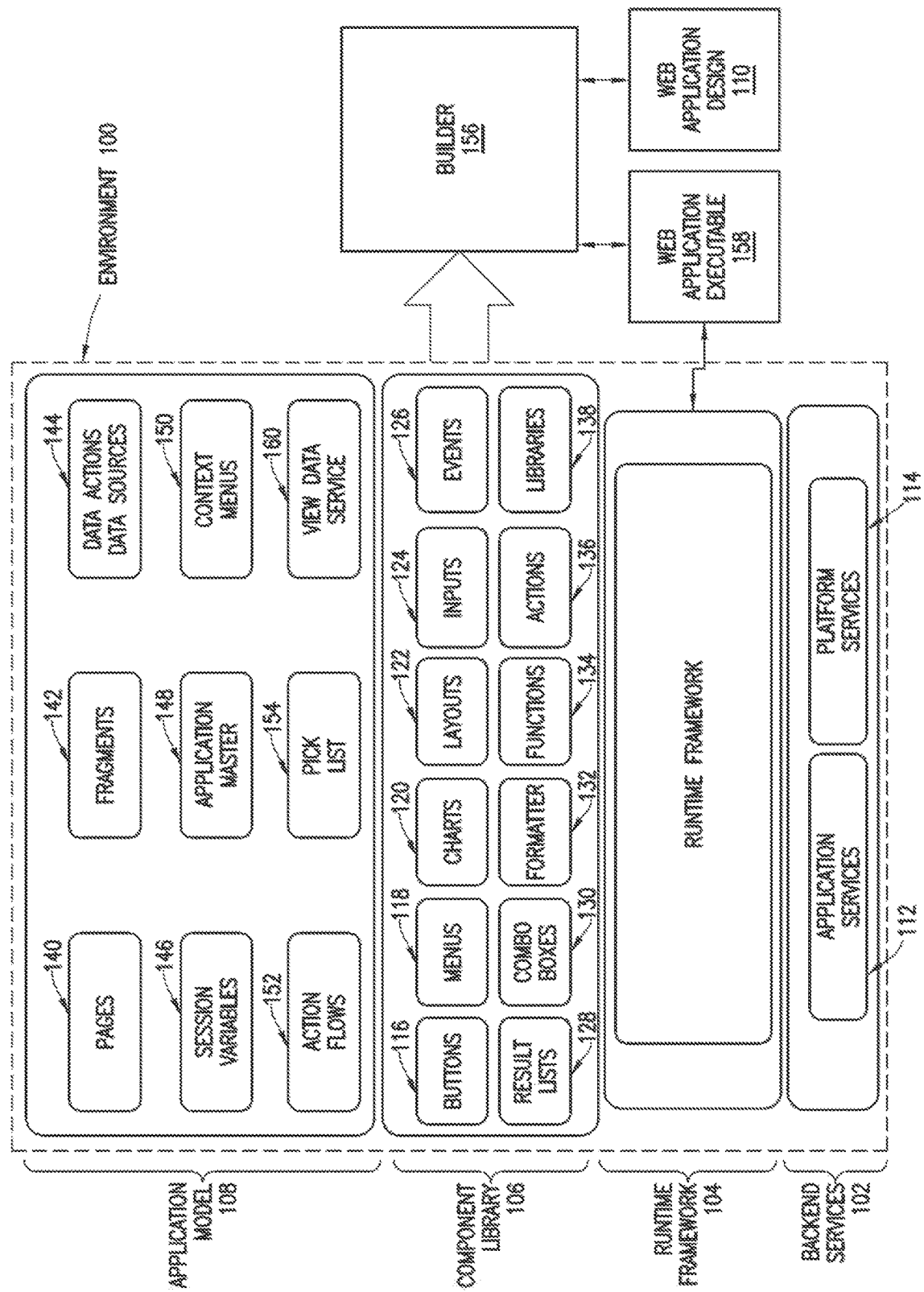
FIGS. 1 and 2 show schematic diagrams of systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to a development environment that allows a developer to request auto-generation of a webpage. In particular, the development environment may automatically generate a webpage for a particular business object type based on a template. The developer may then link the webpage to a different business object type, and have one or more user interface (UI) widgets prepopulated with data from an instance of a different business object type. Thus, a webpage that is defined using a template may be prepopulated with data from instances of different business object types.

In one or more embodiments of the technology, a business object type is a representation of a type of real-world object used by a business. For example, a business object type may be a customer, an employee, a product, a company, or other object type. A business object type may include multiple attributes. The attributes are the properties of the real-world object, such as name, address, price, and other attributes. An instance of a business object type is a particular business object having attribute values. For example, if a business object type is an employee, an instance of an employee business object type is a representation of a particular employee.

FIG. 1 shows a schematic diagram of a system in accordance with one or more embodiments of the technology. Specifically, FIG. 1 shows a schematic diagram of an environment (100) for developing and executing a web application that implements the context menu fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface-based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI widgets are components that are displayed to an end user. In other words, instances of the UI widgets are displayed on a display device. In one or more embodiments of the technology, the UI widgets may include, but are not limited to, buttons (116) (e.g., radio buttons, common buttons), menus (118) (e.g., drop down menu, check boxes), charts (120), layouts (122), inputs (e.g., fields) (124) and combo boxes (130). UI widgets in the component library may each be associated with a set of options. The set of options define the execution of the UI widget. Namely, the set of options define how a particular instance of the component is executed. Options associated with the UI widgets may include formatting, any text that is displayed, any action that is to be performed when the UI widget is selected, other options, and/or any combination thereof. The action may be to: perform an operation on the page, transition to a specific static page, evaluate an expression to determine the page for transitioning, update one or more instances of a business object type, and/or perform another operation.

In one or more embodiments of the technology, the expression may specify one or more data sources and operations to perform on the data from one or more data sources. A data source is a location of data that is not within the expression. For example, the data source may be another portion of the application page, a data repository, returned data for an instance of a business object type, or another data source. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page. The result of evaluating an expression may be data for display on a webpage, a particular query to a data source, another result, or a combination thereof.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions which enable arranging of the data in specific formats in accordance with one or more embodiments of the technology. A formatter may be applied to number, date time values, other values, or a combination thereof. In accordance with one or more embodiments of the technology, functions (134) are the re-usable piece of code, which takes a set of inputs and returns an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), a pick list (154), and a view data service (160). Each of these components of the application model is described below.

A page (140) in the application model (108) is a template for a webpage. In other words, a page in the application model (108) is a template for a complete and individual document that is displayable to the end user. In one or more embodiments of the technology, a page in the development environment is a generic template in that the page is generic to any business object type. The generic template may include instructions for defining a webpage of a particular type, such as, for example, a create webpage, an update webpage, a validate webpage, and a delete webpage. Such instructions may, for example, include an instruction to iterate through each attribute type of the business object type and generate a field or other UI widget for the attribute type and a label in a webpage.

An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. In other words, context menus are selected in a same or similar manner, but have options that are dependent on the context in which the context menu is displayed.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

A view data service (160) is an interface to a corresponding business object type. In particular, the view data service (160) binds a UI widget to a corresponding business object type. The view data service (160) for a business object type may, for example, have an input parameter of a unique identifier of an instance of the business object type. The view data service (160) may have output of the properties of the business object, which may be used in an instruction of a UI widget. Thus, a view data service (160) incorporated into a composition of a web application that is transmitted with a page exposes storage of the business object. The storage may then be accessed by the browser of the web application that interprets the page to retrieve an instance of the business object. Thus, when a developer wants to incorporate data from a different business object than the one used to generate the webpage, the developer may bind a UI widget to the view data service for the business object.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business object types, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, package and deploy the web application. The builder (156) may also include components and functionality to perform source control and project/library management.

Figure 2:
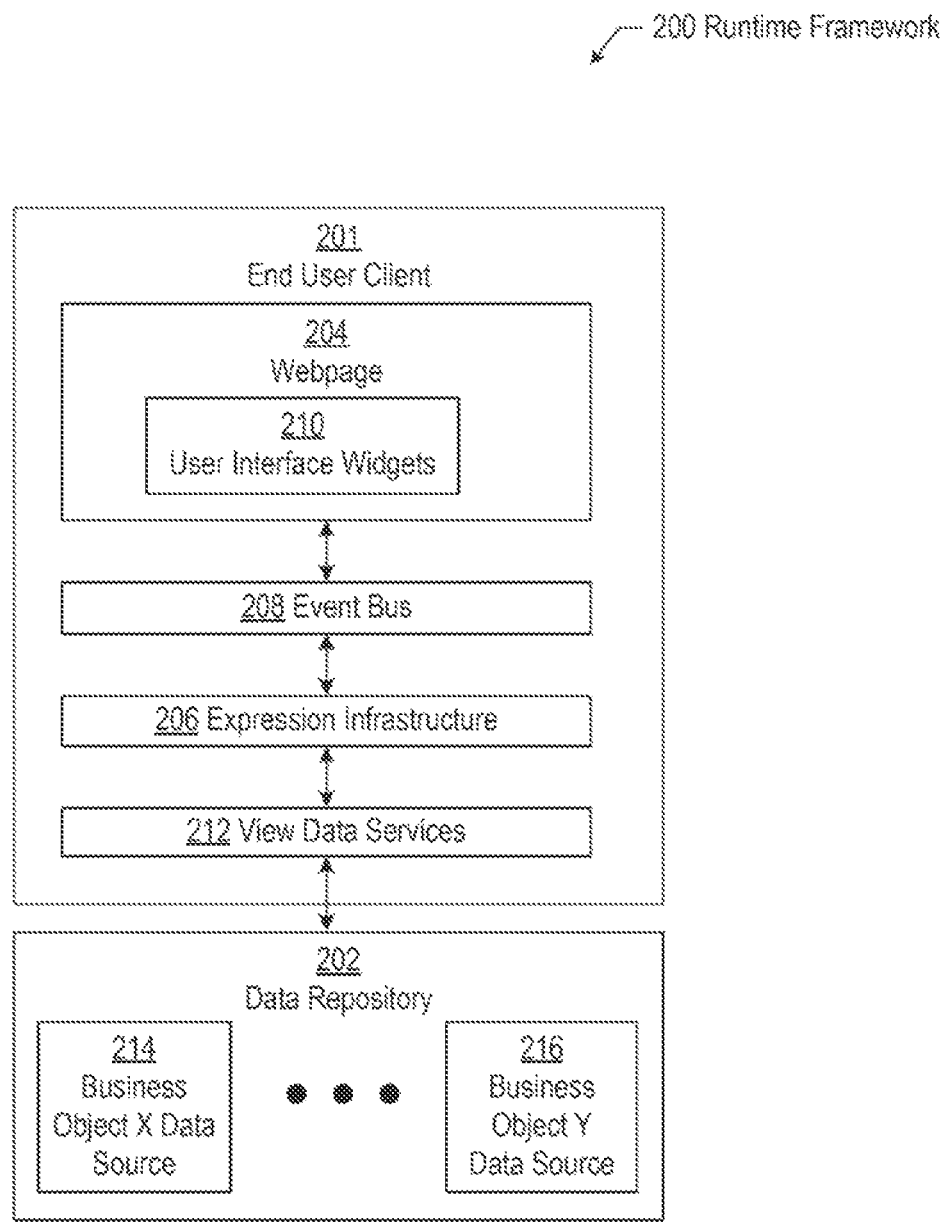

FIG. 2 shows a schematic diagram of a runtime framework (200) in accordance with one or more embodiments of the technology. In particular, FIG. 2 shows a schematic of the web application discussed above, when deployed to and executing on an end user client. As shown in FIG. 2, the runtime framework includes a data repository (202) and an end user client (201). Both of these components are described below.

In one or more embodiments of the technology, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. The data repository (202) includes functionality to store business object data sources (e.g., business object X data source (214), business object Y data source (216)).

Business object data sources (e.g., business object X data source (214), business object Y data source (216)) are sources of business object data. Specifically, the business object data sources include functionality to provide data for a particular requested business object. Business object data sources may be heterogeneous. For example, one business object data source may be a database while another business object data source is a website. Further, one or more of the business object data sources may be operated by a third party while another business object data source is local.

In one or more embodiments of the technology, the end user client (201) is the client-side portion of the web application that executes in a web browser. Although FIG. 2 shows the data repository (202) as remote from the end user client (201), all or a portion of the data repository (202) may be local on the client device of the end user client (201). In one or more embodiments of the technology, the end user client (201) includes functionality to execute a webpage (204), an event bus (208), an expression infrastructure (206), and view data services (212) in accordance with one or more embodiments of the technology.

In one or more embodiments of the technology, the webpage (204) is a particular instance of the webpage generated in the development environment and displayed on an end user's device. In other words, the webpage (204) is an instance of a page, discussed above, that is displayed to a user. The webpage (204) may include UI widgets (210). The UI widgets may be instances of the same or similar UI widgets discussed above with reference to FIG. 1. In one or more embodiments of the technology, the UI widgets are prepopulated with data from multiple business object data sources (e.g., business object X data source (214), business object Y data source (216)) according to an expression.

In one or more embodiments of the technology, an expression infrastructure (206) is interposed between the webpage (204) and the data repository (202). In particular, the expression infrastructure is operatively connected, directly or indirectly, to the data repository (202) and the webpage (204). In one or more embodiments of the technology, the expression infrastructure (206) includes functionality to obtain an instruction that includes an expression for prepopulating a UI widget, obtain data from one or more data sources for executing the expression, and executing the expression based on the data from the one or more data sources to obtain a result.

In one or more embodiments of the technology, an event bus (208) may be interposed between the expression infrastructure (206) and the webpage (204). In one or more embodiments of the technology, an event bus (208) includes functionality to receive an event and to call a corresponding infrastructure (e.g., expression infrastructure (206)) to perform the action requested by the event. For example, the event may be a command to display a webpage (204), update a business object data source (e.g., business object X data source (214), business object Y data source (216)), display a menu, or another event.

The expression infrastructure (206) may be operatively connected to the view data service (212) to access data in the data repository (202) in accordance with one or more embodiments of the technology. As discussed above with reference to FIG. 1, the view data services (212) is a portion of the web application that exposes the underlying business object data source so that the end user client (201) may obtain the data for an instance of the business object. In other words, rather than the end user client (201) being provided with a complete page having populated data from a remote server, the end user client executes the instructions and obtains data for each UI widget (210). Through the view data service (212) for a corresponding business object, the UI widget is bound to the business object type at the data source and, thus, the data from a business object instance may be obtained.

While FIGS. 1 and 2 show a configuration of components, other configurations may be used without departing from the scope of the technology. For example, various components may be combined to create a single component. As another example, the functionality performed by a single component may be performed by two or more components.

Figure 3:
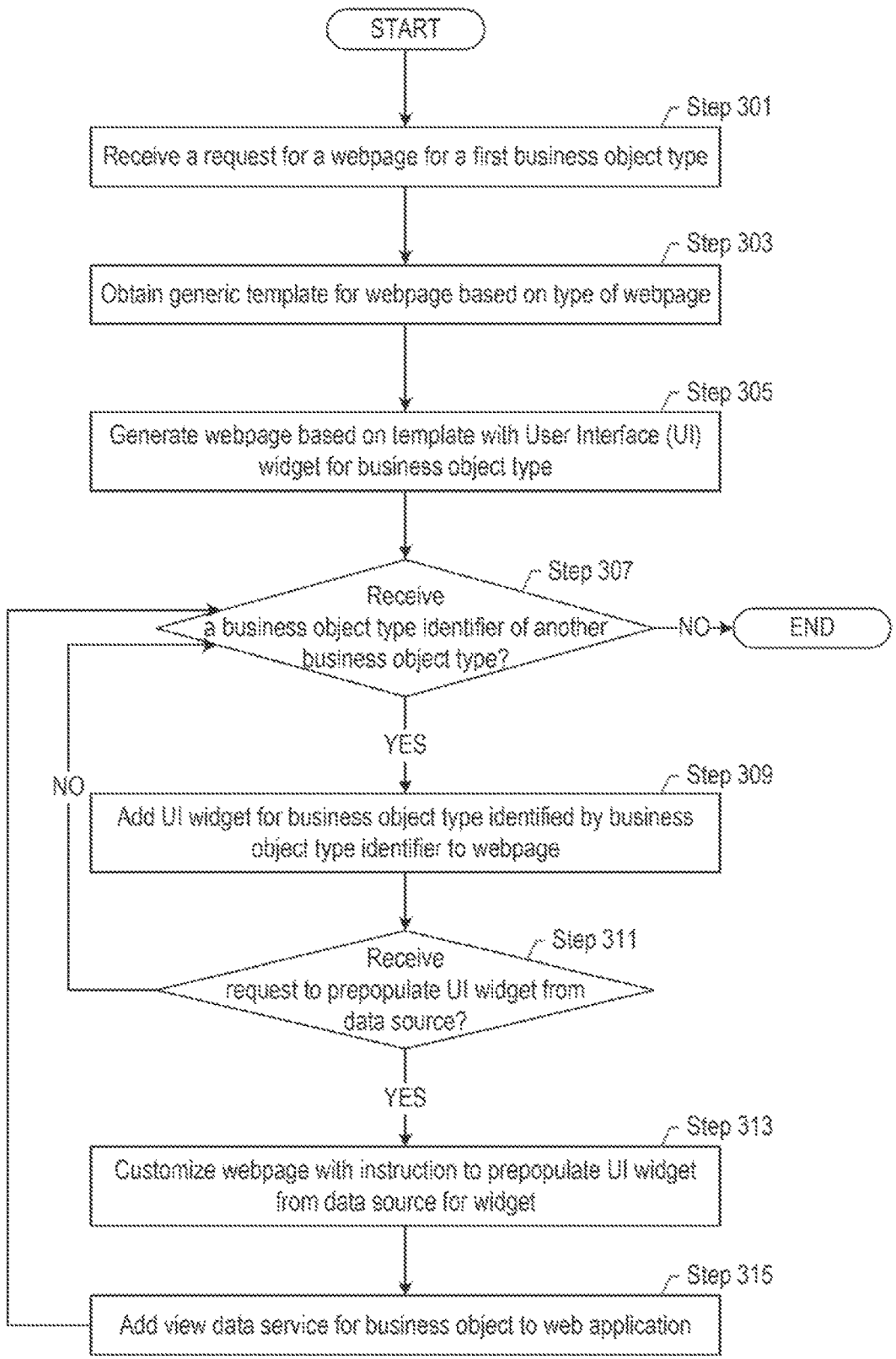
FIGS. 3 and 4 show flowcharts in accordance with one or more embodiments of the technology.
Figure 4:
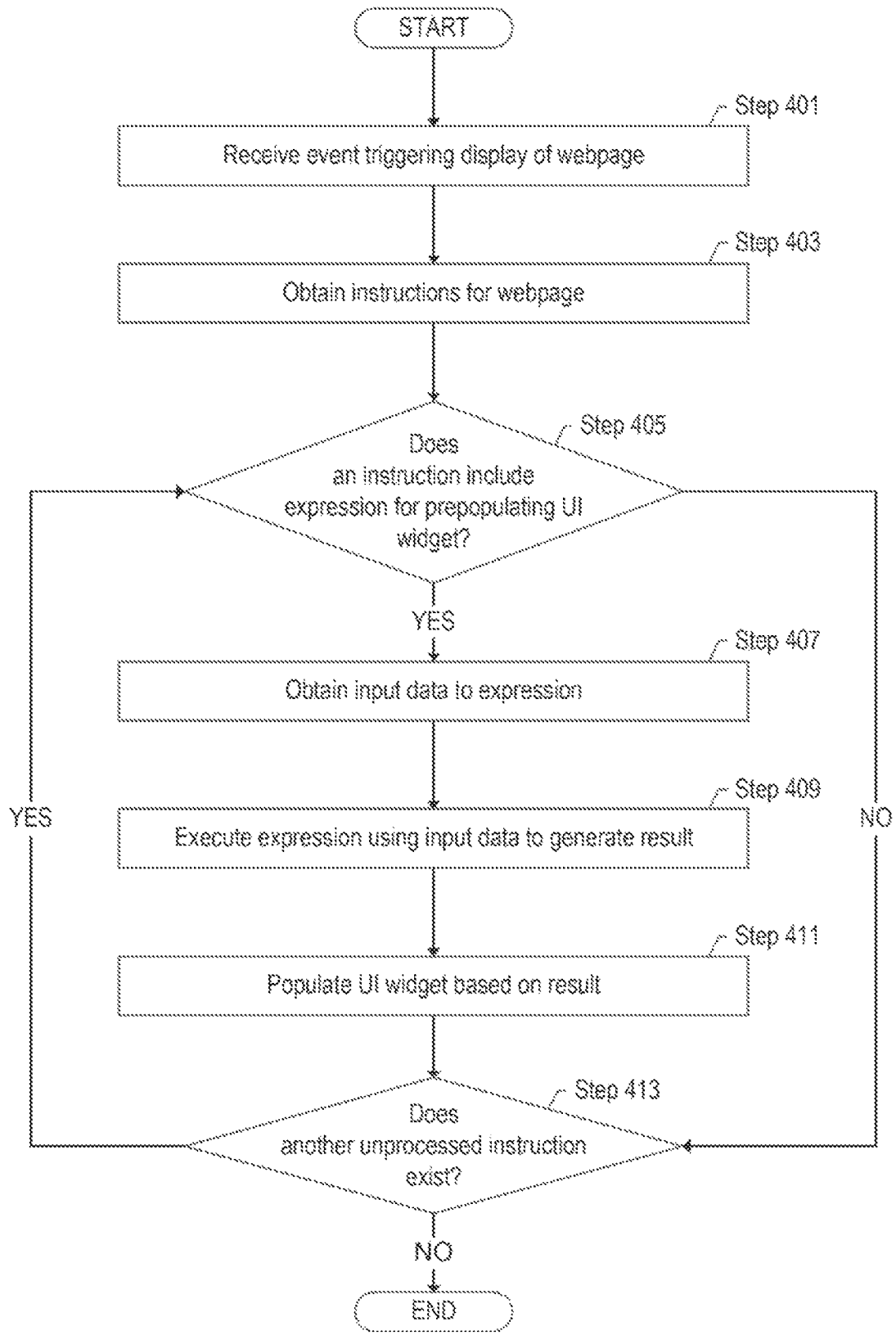

FIGS. 3 and 4 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 3 shows a flowchart for generating a web application, such as, for example, by and using the development environment discussed above with reference to FIG. 1. In Step 301, a request is received for a webpage for a first business object type in accordance with one or more embodiments of the technology. In particular, the development environment shown in FIG. 1 facilitates a drag and drop and an expression-based development of a web application. Thus, using the developer tools offered by the development environment, a developer may drag and drop components into a web application design to define various components of the web application design. Some of the components may have predefined templates and logic. In such a scenario, once dragged into the web application design, the developer may submit values of various parameters of the components. For example, the developer may submit a unique identifier, any references, or any other information.

For a webpage, the developer may select a particular business object type and select a type of webpage for the business object type. For example, the developer may select a create webpage for the business object type to create a new instance of the business object type. By way of another example, the developer may select an update webpage for the update business object type.

In Step 303, a generic template is obtained for a webpage based on the type of webpage in accordance with one or more embodiments of the technology. In particular, the template corresponding to the type of webpage that is generic to business objects may be obtained from a data repository for the development environment.

In Step 305, a webpage is generated based on the template with UI widgets for a business object type in accordance with one or more embodiments of the technology. Hidden from the developer, the development environment may obtain the template based on the type of webpage and populate the template for the particular business object type. For example, from the definition of the business object type, attributes may be obtained. For each attribute, a UI widget, such as a field or drop-down box may be added to the webpage along with a label. Thus, the developer may be automatically presented with a webpage that is automatically customized to perform the desired function on a particular business object. The developer may add additional customizations by moving UI widgets, changing various parameters of one or more widgets, and adding other UI widgets in accordance with one or more embodiments of the technology.

Within the developer environment, the builder may maintain an internal version of the web application design, such as in extensible markup language (XML) format that describes the web application design.

In Step 307, a determination is made whether a business object type identifier of another business object type is received in accordance with one or more embodiments of the technology. In particular, a developer may select a UI widget and request to bind the UI widget to a view data service for a different business object type. If the developer does not select to add another business object type, then the flow may proceed to end. If a determination is made to add another UI widget for another business object type, the flow may proceed to Step 309.

In Step 309, a UI widget for the business object type identified by the business object type identifier is added to the webpage in accordance with one or more embodiments of the technology. In one or more embodiments of the technology the developer may select the business object type from a list of available business objects. The developer may then request the generation of a UI widget for the selected business option. For example, the developer may select a menu option from a context menu for the business object or drag the UI widget to the webpage definition, or perform another action. As another example, the developer may add the UI widget to the webpage definition, and under the properties of the UI widget, add an expression to link the UI widget to the business object. Because the view data service exposes each business object to the developer, the developer may bind the UI widget through the expression-based language to any business object in accordance with one or more embodiments of the technology.

In Step 311, a determination is made whether a request is received to prepopulate the UI widget from a data source in accordance with one or more embodiments of the technology. In one or more embodiments of the technology, one of the properties for the UI widget is to specify initial data for the UI widget. The initial data may be defined in the form of a constant value or an expression. Thus, a request may be received to prepopulate the UI widget from a data source when the developer submits an expression. If a request is not received to prepopulate the UI widget, then the flow may return to Step 307. If a request is received to prepopulate the UI widget from a data source, the flow may proceed to Step 313.

In Step 313, if a request is received to prepopulate the UI widget with data from a data sources, then the webpage is customized with an instruction to prepopulate the UI widget from the data source for the UI widget in accordance with one or more embodiments of the technology. In particular, the developer may submit the expression defining the data source having the business object with the requested data. In one or more embodiments of the technology, the expression may include virtually any mathematical or functional operator, may be a conditional expression, and/or may have other operators. Further, the expression may be dependent on or take input from prepopulated data for other data sources. For example, if an employee and the employee's manager are to be on the same webpage, the employee identifier, which is used to populate one UI widget, may be used as input to identify the name of the manager of the employee that is used to populate another UI widget. Thus, the expressions may be linked.

Further, in one or more embodiments of the technology, data may be obtained for a different business object type than the business object for which the webpage is initially generated. Thus, even though the template is customized by the webpage application for a particular business object, the webpage may be further customized for using data from different data sources through the view data service interface.

Thus, receiving the webpage definition may include receiving the developer's input through the graphical user interface of the developer environment and generating the internal version of the web application design while the web application design is being developed. In one or more embodiments of the technology, for each expression, an instruction may be generated, such as by a code generator, to implement the expression. For example, the expression may be encapsulated in an instruction for the UI widget. Thus, the developer does not need to specify the instructions of the webpage. Rather, the developer may simply drag and drop UI widgets, provide properties for the UI widgets, and have the builder generate the code for each webpage and the web application.

In one or more embodiments of the technology, in Step 315, a view data service is added for the business object to the webpage. In other words, a view data service may be created and bound to the business object. In creating the view data service, the output of the view data service may be set to include all or a subset of the properties of the business object. For example, by default, all, none, or a predefined set of properties may be exposed through the view data service. The developer may then change the set of properties that are exposed. For example, if an employee business object has properties of an employee identifier, a name, an address, and a social security number, a view data service may be created for the employee business object that takes as input the employee identifier, and sets as output the employee name. The developer may further expose the employee address. The employee social security number may remain unexposed by the view data service. Thus, the UI widget could not be modified to show the employee social security number by a nefarious end user. The flow may return to Step 307 to process another business object, if it exists.

Once the code is generated, the web application may be executed. FIG. 4 shows a flowchart of executing a web application, such as by and using the runtime environment discussed above in reference to FIG. 2, in accordance with one or more embodiments of the technology. In one or more embodiments of the technology, the operations in FIG. 4 are performed by the end user client, such as a web browser. In Step 401, an event triggering a display of a webpage is received in accordance with one or more embodiments of the technology. For example, an end user may navigate to a next page of a web application, load the web application, or perform another action.

In Step 403, instructions for the webpage are obtained in accordance with one or more embodiments of the technology. In one or more embodiments of the technology, in response to the event, the target page to display is determined. The code for the target page may be obtained from a cache, such as on the end user's device, or may be obtained from a remote data store. Each instruction may be retrieved and executed or processed in order to populate webpage with UI widgets. In one or more embodiments of the technology, the execution of the instructions is performed by the client browser. In particular, rather than obtaining a completed and populated page from the server, the client browser that is located on the end user's device executes each instruction and requests data from one or more data sources. Thus, because UI widgets may be bound to different view data service interfaces, and, thus, to different data sources for different business object types, a single page may encompass data from different data sources.

In Step 405, a determination is made whether an instruction includes an expression for prepopulating a UI widget in accordance with one or more embodiments of the technology. In particular, the instruction for a UI widget is executed. If the instruction does not include an expression for prepopulating the UI widget, the flow may proceed to Step 413. If the instruction includes an expression for prepopulating the UI widget, the flow may proceed to Step 407.

In Step 407, input data to the expression is received in accordance with one or more embodiments of the technology. In one or more embodiments of the technology, the expression may reference data sources on the webpage, prepopulated data for other UI widgets, one or more external data sources, or any other data. Executing the expression may include accessing a local cache and/or one or more data repositories to obtain the data from the various data sources.

In Step 409, the expression is executed to generate a result in accordance with one or more embodiments of the technology. Executing the expression may include performing one or more operations in the expression. For example, the operations may include comparing data from a data source to a value, and selecting a process fragment if the data matches. As a result of executing the expression, a result is obtained. The result may be a particular item of data, a query to another data source or any other result.

In Step 411, the UI widget is populated based on the result in accordance with one or more embodiments of the technology. In particular, the result or the obtained data from a query of the result is populated into the UI widget that may be displayed to the user. In one or more embodiments, retrieving data is through the view data service for the corresponding business object. In other words, the request for a particular property of an instance of the business object is made by a query on the view data service. The view data service that is bound to the business object retrieves the data and exposes the data to the corresponding UI widget. Thus, the UI widget may be populated with the retrieved data.

In Step 413, a determination is made whether another unprocessed instruction exists. If another unprocessed instruction exists, the flow may proceed to Step 405 to process the next instruction. If another unprocessed instruction does not exist, the flow may proceed to end in accordance with one or more embodiments of the technology. In one or more embodiments of the technology, although not shown in FIG. 4, the webpage may be displayed on a display device for the end user. If the page is an update page, then the end user may view the content on the webpage, update one or more UI widgets, and submit results back to the data repository using the webpage in accordance with one or more embodiments of the technology.

Figure 5:
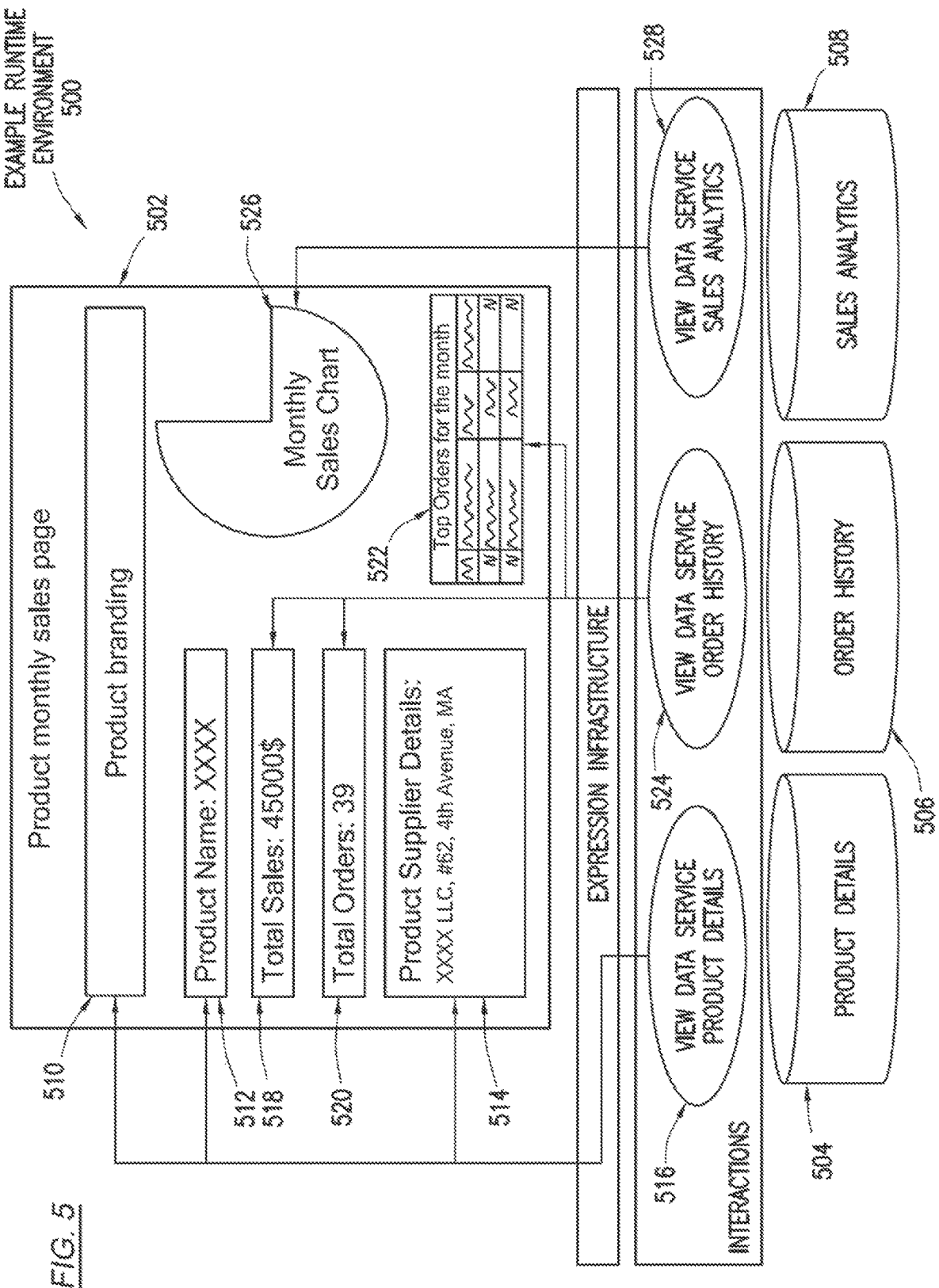
FIGS. 5 and 6 show examples in accordance with one or more embodiments of the technology.
Figure 6:
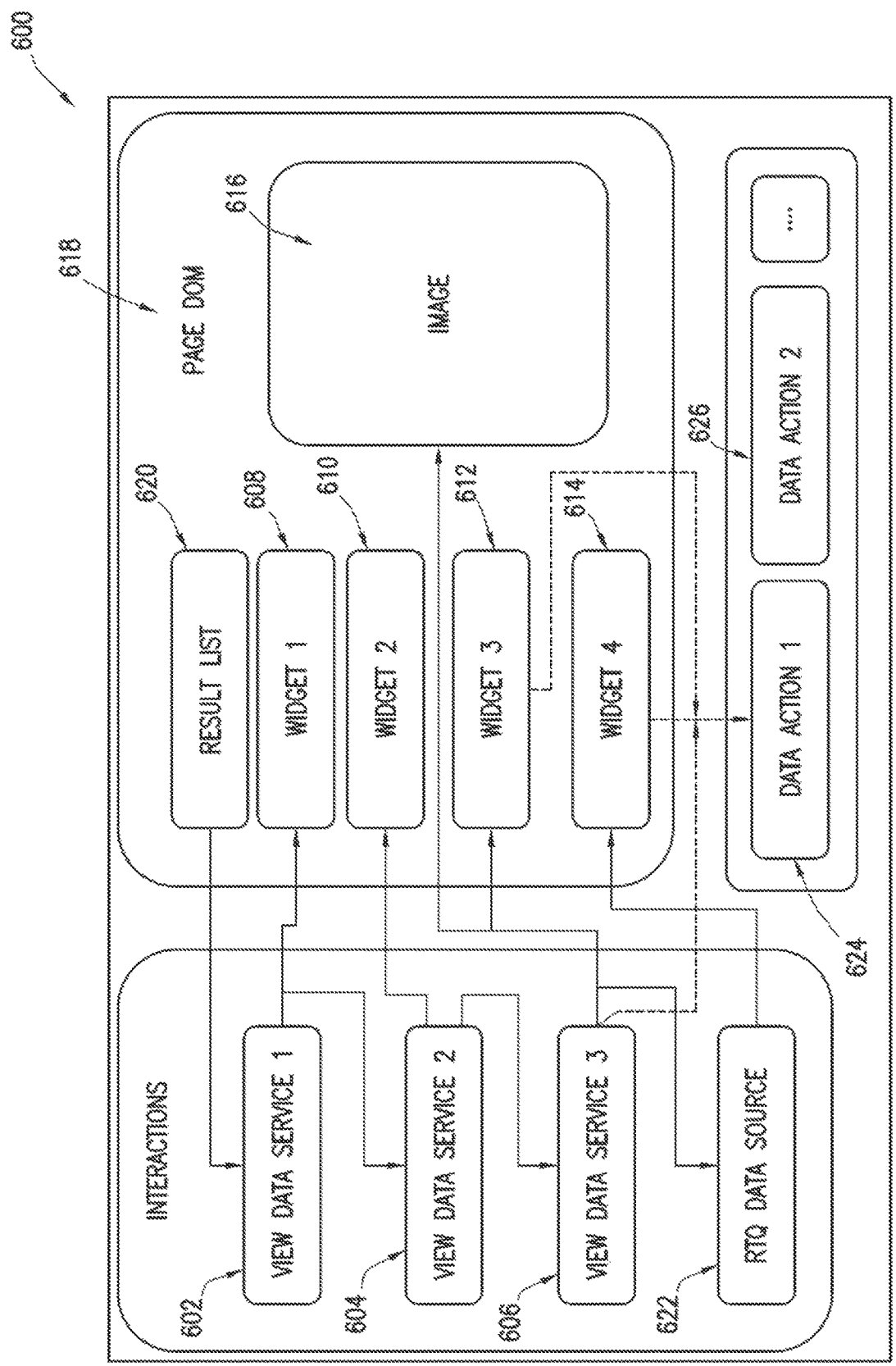

FIGS. 5 and 6 show examples in accordance with one or more embodiments of the technology. The examples shown in FIGS. 5 and 6 may be performed by the systems and method discussed above with reference to FIGS. 1-4. The following examples are for explanatory purposes only and not intended to limit the scope of the technology.

FIG. 5 shows an example runtime environment (500) in accordance with one or more embodiments of the technology. In particular, the example shows a product's monthly sales information page (502) for the supplier of the product. Three data sources, namely, 'product details' (504), 'order history' (506), and 'sales analytics' (508) provide data for various UI widgets in the webpage (502). In the example, 'order history' (506) and 'sales analytics' (508) data depend upon a key present in 'product details' (504). In other words, the particular product needs to be identified first, before the order history and sales analytics for the product may be identified.

Rather than performing a single data fetch for an entire page with prepopulated data from a web server, the browser may execute instructions and obtain the data via a view data service binding. As shown in FIG. 5, the product branding (510), product name (512) and product supplier details (514) UI widgets are bound to the view data service for product details source (516). Through the binding with view data services for the product details data source (516), data for the respective UI widgets may be obtained. Similarly, the total sales (518), total orders (520), and top orders for the month (522) widget may be bound to the view data service for order history business object (524). Thus, the data from the order history business object data source (506) may be obtained. Additionally, the monthly sales chart (526) may be bound to the view data service sales analytics interface (528) in order to obtain data from the sales analytics data source (508).

Below is an example of a view data service for product details (516). The product details view data service may have a trigger of loading a page. Further, the product details view data service may take as input, a product identifier. The output of the product details view data service are properties of the product having the product identifier, such as product name, product supplier details, product unique identifier, and a product brand image. As shown in the example, the view data service exposes the interface for accessing information about a particular product from the data source.

In order to use the product details view data service, the following expressions may be defined for the UI widgets. The product branding (510) UI widget may have the expression "Image source=product_details.brand_image". The product details (504) in the expression refers to the view data service for product details (516) that is connected to a business object. The brand_image is the property of the business object that stores an image file showing the image of the brand. Similarly, the product name (512) UI widget may have the expression "Label=product_details.product_name". The product supplier details (514) UI widget may have the expression "Label=product_details.supplier_details". In each of the UI widgets, the first part of the widget may refer to the view data service product details (516) while the second part of the widget refers to the particular property.

The total sales (518) UI widget may have the expression "Label=order_history.total_sales", while The total orders (520) UI widget may have the expression "Label=order_history.total_orders" in order to populate the widget with the corresponding data using the view data service order history (524) and the order history (506). Similarly, for the monthly sales chart (526) UI widget, the expression may be "Src=sales_analytics.rate_sales" to obtain data from the view data service sales analytics (528).

Continuing with the example, the top orders of the month (522) UI widget may have multiple expressions in order to obtain data showing a list of sales orders. The first expression may be used to fetch order details for the product from view data service for order history (524). The expression may be of the form having an input of "order_history.product_id=page_context.product_id" in order to get output of "order_history.order_id [array of values]". The second expression may be to fetch a list of order details from Orders Real Time Query [Data Source] by having input "orders_rtq.order_id=order_history.order_id" to obtain the output of "orders_rtq.customer_name, orders_rtq.amount, and orders_rtq.no_of_orders", which are bound to table UI widget[ResultList] to get the output in tabular format in webpage.

As shown, one or more embodiments provide a technique to obtain data from multiple data sources in a composition-based environment. Thus, even when the web browser is creating the webpage, the data may be obtained.

FIG. 6 shows another example (600) in accordance with one or more embodiments of the technology. In the example shown in FIG. 6, view data service 1 (602), view data service 2 (604), and view data service 3 (606) each expose data from corresponding data sources (not shown) to widgets (e.g., widget 1 (608), widget 2 (610), widget 3 (612), widget 4 (614), and image (616)) on a webpage (618). As shown by the lines, data in the result list widget (620) may be used to identify the data to gather for widget 1 (608) from view data service 1 (602). Similarly, the widgets may be chained, such that data in widget 1 (608) from view data service 1 (602) may be used in view data service 2 (604) to gather data for widget 2 (610). Further, data in widget 2 (610) from view data service 2 (604) may be used in view data service 3 (606) to gather data for widget 3 (612) and image (616). Output from view data service 3 (606) may also be used to query RTQ data source (622) and obtain data for widget 4 (614). When a user updates a widget, the user may select data action (e.g., data action 1 (624), data action 2 (626)) in order to perform an action on the data, such as update the corresponding data sources.

Figure 7:
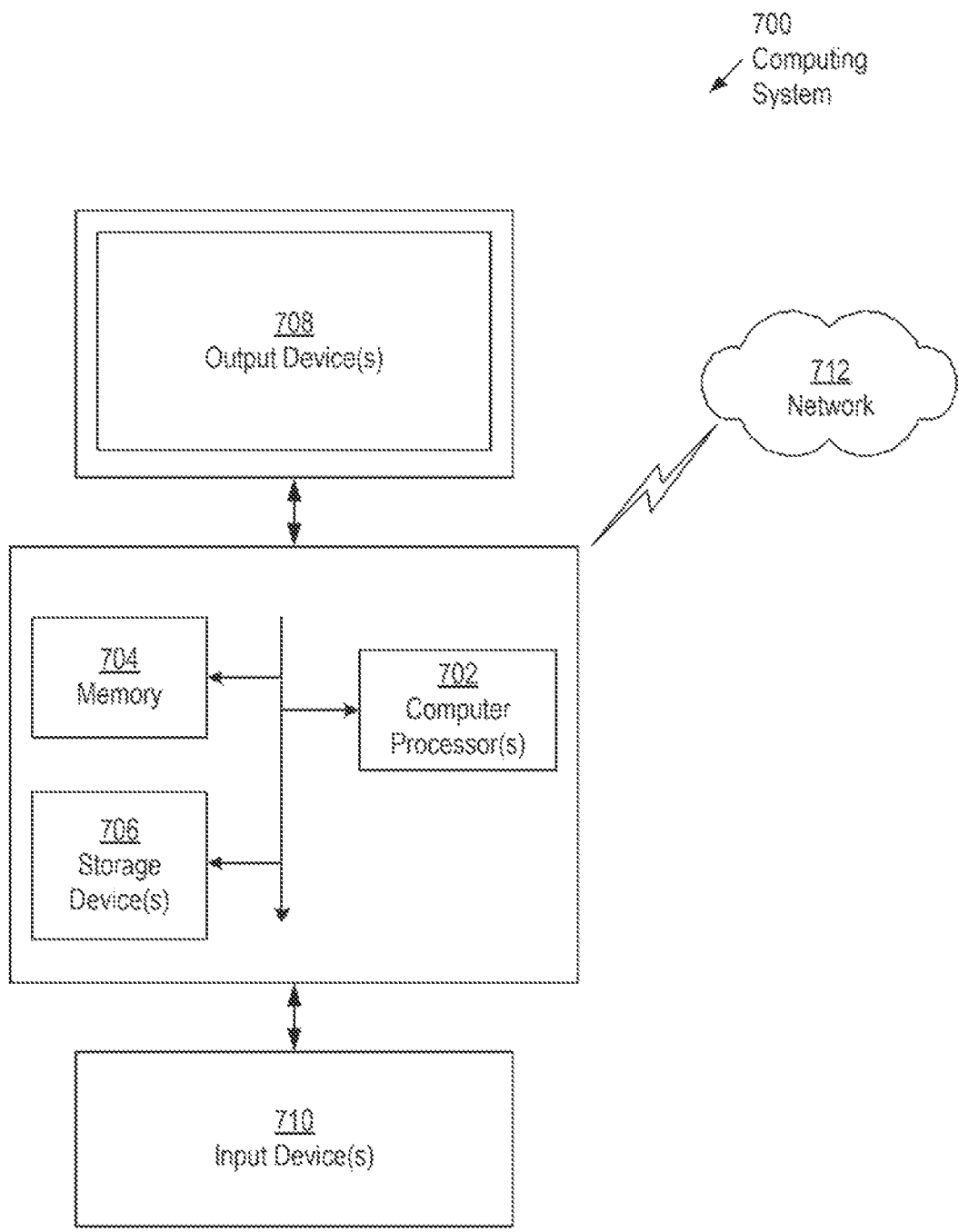
FIG. 7 shows a computing system in accordance with one or more embodiments of the technology.

Embodiments of the technology, such as shown in FIGS. 1-4 and described above, may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for webpage composition, comprising:
   during development of a web application, receiving a first request for a webpage for a first business object type, the first request comprising a first business object type identifier of the first business object type;
   receiving a first expression for selecting an instance of the first business object type from a plurality of instances of the first business object type from an object data source, the first expression specifying a first data source and an activity fragment; and
   generating the webpage, the webpage comprising a first user interface (UI) widget for the first business object type and a first instruction for prepopulating the first UI widget with first data from the instance of the first business object type, the first instruction including the first expression, the first expression executable to perform a sequence of actions, the sequence of actions including the activity fragment, on data from the first data source to generate a result identifying the instance of the first business object type to use to prepopulate the first UI widget.

2. The method of claim 1, wherein the sequence of actions comprises an action flow.

3. The method of claim 2, wherein the sequence of actions comprises actions by which a user is guided using the web application accessing the webpage.

4. The method of claim 1, further comprising obtaining the first instruction via an expression infrastructure interposed between the webpage and a data repository which stores the object data source, obtaining data from the object data source, and executing the first expression based on the data from the object data source to obtain the result.

5. The method of claim 4, further comprising receiving an event via an event bus, and calling the expression infrastructure to perform an action requested by the event.

6. The method of claim 1, wherein the first data source comprises a data repository.

7. The method of claim 1, wherein the first data source comprises returned data for the instance of the first business object type.

8. The method of claim 1, wherein the first data source comprises a portion of the webpage.

9. The method of claim 8, wherein the portion of the webpage comprises a text field.

10. The method of claim 8, wherein the portion of the webpage comprises a drop down menu option.

11. The method of claim 1, wherein the first expression is encapsulated in an instruction for the first UI widget, and wherein generating the webpage comprises dragging and dropping the first UI widget into a web application design and entering parameters for one or more fields associated with the first UI widget.

12. A system, comprising:
    a processor;
    a memory coupled to the processor, the memory storing computer readable program code comprising instructions for:
       during development of a web application, receiving a first request for a webpage for a first business object type, the first request comprising a first business object type identifier of the first business object type;
       receiving a first expression for selecting an instance of the first business object type from a plurality of instances of the first business object type from an object data source, the first expression specifying a first data source and an activity fragment; and
       generating the webpage, the webpage comprising a first user interface (UI) widget for the first business object type and a first instruction for prepopulating the first UI widget with first data from the instance of the first business object type, the first instruction including the first expression, the first expression executable to perform a sequence of actions, the sequence of actions including the activity fragment, on data from the first data source to generate a result identifying the instance of the first business object type to use to prepopulate the first UI widget.

13. The system of claim 12, wherein the first data source comprises returned data for the instance of the first business object type.

14. The system of claim 12, wherein the first data source comprises a portion of the webpage.

15. The system of claim 12, wherein the sequence of actions comprises an action flow.

16. The system of claim 12, wherein the sequence of actions comprises actions by which a user is guided using the web application accessing the webpage.

17. A computer program product comprising a non-transitory computer readable medium storing computer readable program code, the computer readable program code comprising instructions for:
    during development of a web application, receiving a first request for a webpage for a first business object type, the first request comprising a first business object type identifier of the first business object type;
    receiving a first expression for selecting an instance of the first business object type from a plurality of instances of the first business object type from an object data source, the first expression specifying a first data source and an activity fragment; and generating the webpage, the webpage comprising a first user interface (UI) widget for the first business object type and a first instruction for prepopulating the first UI widget with first data from the instance of the first business object type, the first instruction including the first expression, the first expression executable to perform a sequence of actions, the sequence of actions including the activity fragment, on data from the first data source to generate a result identifying the instance of the first business object type to use to prepopulate the first UI widget.

18. The computer program product of claim 17, wherein the sequence of actions comprises an action flow.

19. The computer program product of claim 18, wherein the sequence of actions comprises actions by which a user is guided using the web application accessing the webpage.

20. The computer program product of claim 17, wherein the first data source comprises returned data for the instance of the first business object type.

\* \* \* \* \*